United States Patent [19]

McCloskey

[11] Patent Number: 5,555,296
[45] Date of Patent: Sep. 10, 1996

[54] PAY TELEPHONE STAND

[76] Inventor: Charles R. McCloskey, 139 Shoemaker Ave., Ste. D, Norwalk, Calif. 90650-4533

[21] Appl. No.: 349,564

[22] Filed: Dec. 5, 1994

[51] Int. Cl.⁶ .......................... H04M 17/00; H04M 1/00; H04M 9/00
[52] U.S. Cl. .......................... 379/145; 375/155; 375/437; 375/453
[58] Field of Search .................................. 379/143, 145, 379/155, 419, 437, 428, 451, 453, 454, 440; 248/161, 188.5, 354.1; D14/146, 149, 150, 151

[56] References Cited

U.S. PATENT DOCUMENTS

| | | | |
|---|---|---|---|
| 4,246,451 | 1/1981 | Nix | 379/143 |
| 5,134,654 | 7/1992 | McGough | 379/451 X |
| 5,301,229 | 4/1994 | Raynor | 379/155 X |
| 5,402,476 | 3/1995 | Ohayon | 379/451 X |

*Primary Examiner*—Stephen Chin
*Assistant Examiner*—Paul Loomis
*Attorney, Agent, or Firm*—Charles H. Thomas

[57] ABSTRACT

An upright stand is provided for a coin-operated machine, such as a coin-operated telephone. The stand employs a base firmly attached to an underlying support from which a column having vertical enclosing walls rises upwardly. At its top the column defines a seating opening for receiving a coin-operated machine, such as a coin-operated telephone, in snug, seated engagement within the seating opening. The coin-operated telephone is laterally confined within the enclosing walls of the column. The stand employs an internal mounting system by means of which the telephone is secured within the confines of the column at the upper end thereof by fasteners which are inaccessible from the exterior of the casing of the telephone and from the exterior of the column. Utilizing the stand, a coin-operated telephone is protected from thieves seeking to steal money from the coin box, as well as from vandals.

16 Claims, 3 Drawing Sheets

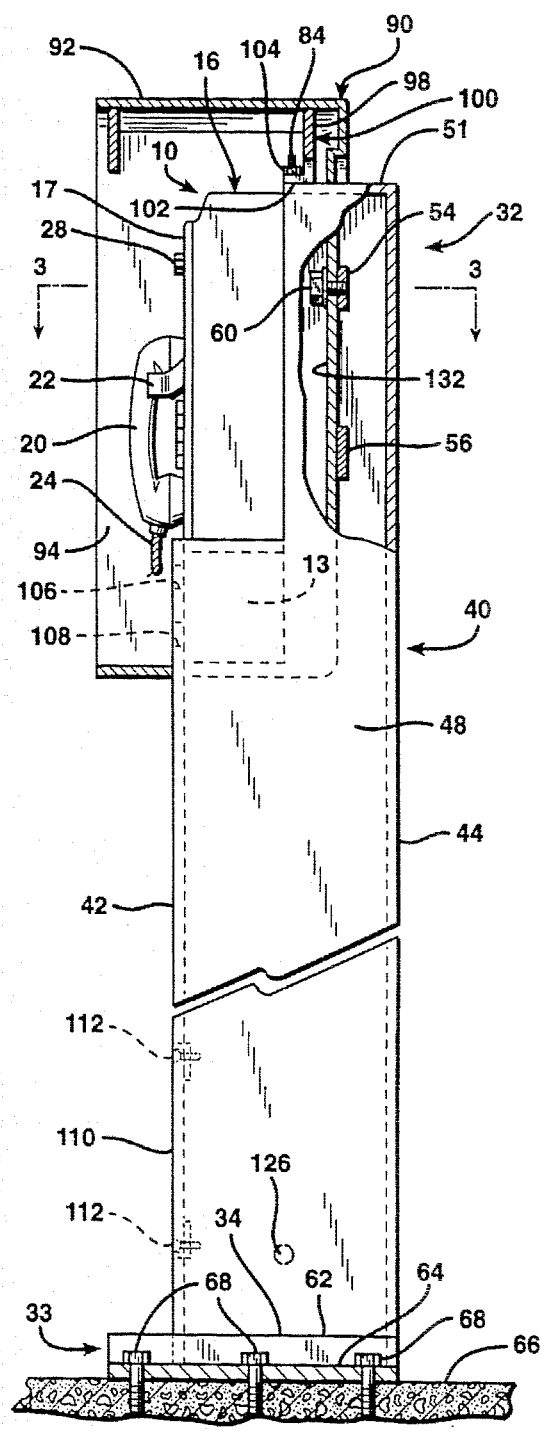
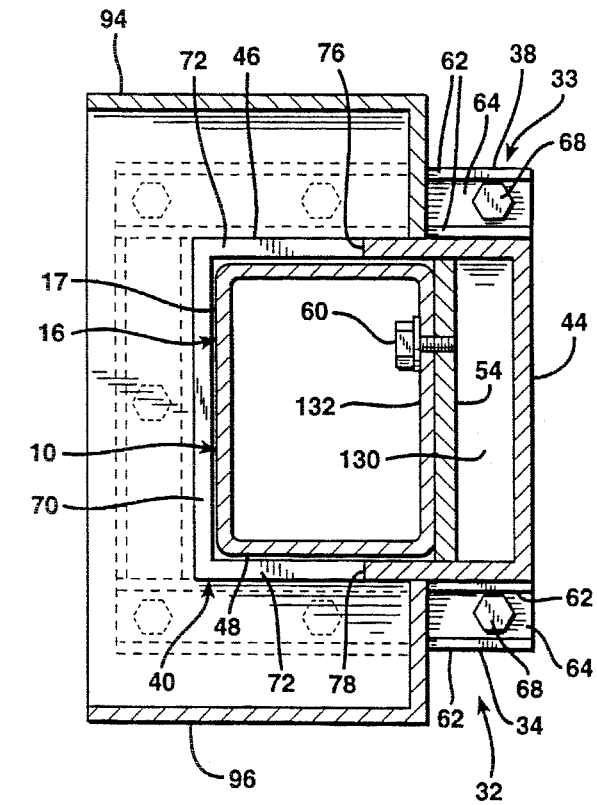

PAY TELEPHONE STAND

BACKGROUND OF THE INVENTION

1. Field of the Invention

The present invention relates to a stand for mounting coin-operated telephones and other coin-operated machines such as vending machines, slot machines, and the like.

2. Description of the Prior Art

At present coin-operated telephones are often mounted upon upright stanchions or walls such that the telephone projects laterally outwardly from a generally vertical surface, such as a vertical wall or other support, several feet above an underlying surface. Coin-operated telephones are configured generally in the shape of rectangular prisms having a height dimension several times that of their width or depth. Very typically a coin-operated telephone is housed within a rugged, durable exterior casing having an outer width dimension of about eight inches, an exterior depth measurement of about six inches, and a height of about twenty-four inches. Because coin-operated telephones are often mounted in unattended locations, their outer casings are fabricated of strong steel both in an attempt to prevent vandalism and also to deter tampering by thieves seeking to steal money from the pay telephone coin box.

In a typical coin-operated telephone the coin box is located in the lower section of the casing beneath the communications mechanism and circuitry and beneath the coin feed, coin processing, and coin return operating mechanisms. A coin-operated telephone typically has an internal coin box that is accessible to authorized personnel by means of a coin box door in the front of the exterior casing. The coin box door requires a special key for access. Coins ace periodically retrieved from the coin box by telephone company personnel who travel to each coin-operated telephone location, open the coin box with the special key, remove the coins which have accumulated in the coin box, and close and lock the coin box access door.

Despite the fact that the exterior casings of coin-operated telephones are of rugged construction and are designed to resist tampering, they have proven to be increasingly vulnerable to ever more unscrupulous and audacious thieves.

In a typical telephone mounting system the telephone casing is mounted to the exterior surface of a generally vertical support, such as a telephone booth wall, or a post in the ground by bolts which project through the back wall of the telephone casing and which are secured to the supporting vertical structure. The heads of the mounting bolts are normally inaccessible to thieves since the upper front portion of the telephone casing must be removed from the remaining portion of the casing in order to gain access to the heads of the mounting bolts. The upper front portion of a conventional, coin-operated telephone casing is secured to the internal frame of the telephone box by means of a specialized bolt that requires a specialized tool for removal. Design precautions have been taken in the construction of coin-operated telephones to minimize thievery of the coins collected in the coin boxes therein. Nevertheless, thieves have become ever more ruthless and aggressive in devising systems for stealing the coins collected in coin-operated telephone boxes, as well as coins collected in comparable machines, such as gumball and other article vending machines, and slot machines.

In a typical coin-operated telephone installation, the lower surface of the rectilinear casing of the telephone is disposed horizontally several feet above a supporting surface, such as a concrete slab which may be the floor of a telephone booth, pavement, or a concrete base in which a supporting post is set. Thieves have developed a technique for looting coin-operated telephones by taking the entire telephone, casing and all, from the site at which it is installed for service, to an isolated location. There, the thieves gain access to the coin box through the use of brute force that destroys the telephone casing. That is, such thieves may beat the casing apart with sledgehammers, or even use explosives to destroy the integrity of the coin box so as to gain access to the coins collected therein.

Thieves are typically able to readily remove a coin-operated telephone from the site at which it is installed by taking an inexpensive piece of wood, such as a four inch by four inch post section approximately two to three feet in length, and positioning the wooden post section upright atop the lifting pad of an automotive vehicle jack when the jack is in its retracted position. The thieves then operate the automotive vehicle jack to raise the lifting pad thereof beneath the wooden post section in the same manner as the jack is used for lifting a vehicle for changing a tire.

With the large vertically upwardly directed force that can be developed with an automotive vehicle jack, the upward force of the jack is transmitted vertically through the wooden post and readily shears off the shanks of the bolts holding the telephone casing to its mounting structure. The thieves can then easily rip out the connections of the electrical communications lines and escape with the entire telephone to a site where they then destroy the telephone and loot the coin box.

The losses generated by coin-operated telephones looted in this manner are not limited merely to the fifty or sixty dollars worth of coins that are typically collected in a coin-operated telephone collection box prior to retrieval by authorized personnel. Indeed, this loss is quite minimal when compared to the loss of the entire coin-operated telephone.

A further technique in thievery used to steal money from coin-operated telephones involves tampering with the coin return mechanism. According to one technique a thief will take a flammable plastic wrapping material, such as that used to wrap foods for household storage, and force a wadded quantity of this material up into the coin return chute located above a coin-operated telephone coin return tray. In this way coins that would otherwise be returned to legitimate users are trapped within the coin return chute. The thief then returns several days later, or even several weeks later, and used a cigarette lighter or match to ignite the flammable material that has been wadded up into the coin return chute. The material thereupon burns and disintegrates, thus releasing the coins that have been trapped above it. The thief then absconds with the released coins.

SUMMARY OF THE INVENTION

The present invention involves a unique stand for use with coin-operated telephones and other coin-operated devices. The stand is designed to prevent thievery and vandalism of the type hereinbefore described. A primary object of the present invention is to provide a stand for a coin-operated telephone or other coin-operated machine which not only provides a means for mounting the telephone at an appropriate height for its intended use, but which protects and safeguards not only the coin collection box but the entire operating mechanism housed within the exterior casing of the telephone as well.

A further object of the invention is to provide a stand for a coin-operated machine, such as a public telephone, that is constructed in such a manner as to deter potential thieves from attempting to tamper with the coin-operated device. Indeed, the stand of the invention provides a rugged, durable mounting system that is not only highly functional for mounting a telephone at its appropriate height, but which seats a telephone therewithin in such a manner as to deny access to the contents of the telephone casing by anyone lacking the specialized tools that are employed by telephone company personnel to service and collect coins from pay telephones.

A further object of the invention is to provide a telephone stand that prevents tampering with the coin return mechanism so as to thwart thievery of this type as well.

Yet a further object of the invention is to provide a stand for a coin-operated telephone that protects not only the integrity of the components housed within the telephone casing, but which also protects the communications wiring leading to the telephone.

In one broad aspect the present invention may be considered to be a stand for a coin-operated machine having an exterior, an interior protected by the exterior, a coin collection box within the interior, and a coin box access door in the exterior. The stand of the invention is comprised of a base firmly attached to an underlying support and a hollow, upright column permanently secured to the base. The upright column has vertically enclosing walls and defines an upper end with a seating opening therein for seating the coin-operated machine therewithin such that the coin-operated machine is laterally confined within the enclosing walls.

A mount is located internally within the enclosing walls of the column proximate the seating opening. A fastener, inaccessible from the exterior of the coin operated machine, is provided for securing the coin-operated machine to the mount. The upright column of the stand also defines a coin box door access opening in the enclosing walls below its upper end for providing authorized access to the coin box door. In this way authorized telephone company or other authorized coin box collection personnel have access to the contents of the coin box in a conventional manner. Nevertheless, the coin-operated machine is protected from vandals and thieves to an extent that has heretofore been unattainable.

In another broad aspect the invention may be considered to be a stand for a coin operated telephone having a case with a coin box located therein and an access door in the case providing authorized access to the coin box. The stand of the invention is comprised of a base firmly secured to an underlying support, and a hollow column of rectangular cross-section permanently secured to the base and extending vertically upwardly therefrom. The column has laterally enclosing front, back, and opposing side walls all having upper ends terminating at upper extremities.

The column defines a seating opening at the upper extremity of the front wall and at the forward portions of the upper ends of the opposing side walls at the upper ends thereof. This seating opening receives the case of the coin-operated telephone within the lateral confines of the front, back, and side walls. A coin box door access opening is defined in the front wall of the column beneath the seating opening. This coin box access door opening provides authorized access to the coin box of the coin-operated machine. The stand is further comprised of a telephone mount which is located internally within the column behind the seating opening therein, and a fastener located internally within the coin-operated telephone for securement to the telephone mount.

In still another broad aspect the invention may be considered to be in combination: a coin-operated telephone having an internal coin box and a surrounding outer casing with a coin box door therein, and a protective stand. The protective stand includes a base firmly secured to an underlying support, and a hollow column of rectangular cross-section permanently secured to the base and extending vertically upwardly therefrom. The hollow column has laterally enclosing front, back, and opposing side walls formed with upper extremities defining a seating opening therein. The outer casing of the telephone is disposed within the lateral confines of the front, back, and opposing side walls.

The column defines a coin box door access opening within its front wall for providing authorized access to the coin box door of the telephone. A phone mount is located internally within the column within the lateral confines of the front, back, and side walls. A fastener is inaccessible from the exterior of the telephone case and from the exterior of the column secures the telephone to the phone mount.

Preferably the stand is further comprised of a roof that spans the upper extremities of the side walls and extends forwardly from the upper extremity of the back wall. The seating opening is defined by an upwardly facing top edge of the front wall at the upper extremity thereof, upwardly and forwardly facing edges of the side walls, and a forwardly facing edge of the roof.

Preferably also the protective stand is equipped with mounting studs and the combination of the invention is further comprised of a sheltering hood that is secured on the mounting studs to the stand. The hood is of the conventional type normally employed with coin-operated telephones. Such hoods serve to protect the operating mechanism of the telephone from the elements, provide shelter from the elements for a person using the telephone, and reduce the level of ambient noise so as to facilitate communications between an individual using the phone and a distant party.

Another preferred feature of the invention is an optical sensor port defined in the front wall of the column. Some telephones are now equipped with optical sensors that provide illumination in the vicinity of the telephone, typically through connection to an overhead electrical light within the hood, when a person stands in front of the phone.

Preferably also the column further defines a removable wiring access opening therein. This opening is located at an elevated level above the base. Removable wiring port closures are also preferably formed in the column. These typically take the form of knockout slugs which can be provided in the wall or the roof of the stand.

The invention may be described with greater clarity and particularity by reference to the accompanying drawings.

DESCRIPTION OF THE DRAWINGS

FIG. 2 is a sectional elevational detail view, partially broken away, taken along the lines 2—2 of FIG. 1.

FIG. 3 is a sectional plan detail taken along the lines 3—3 of FIG. 2.

DESCRIPTION OF THE EMBODIMENTS

Figure 1:
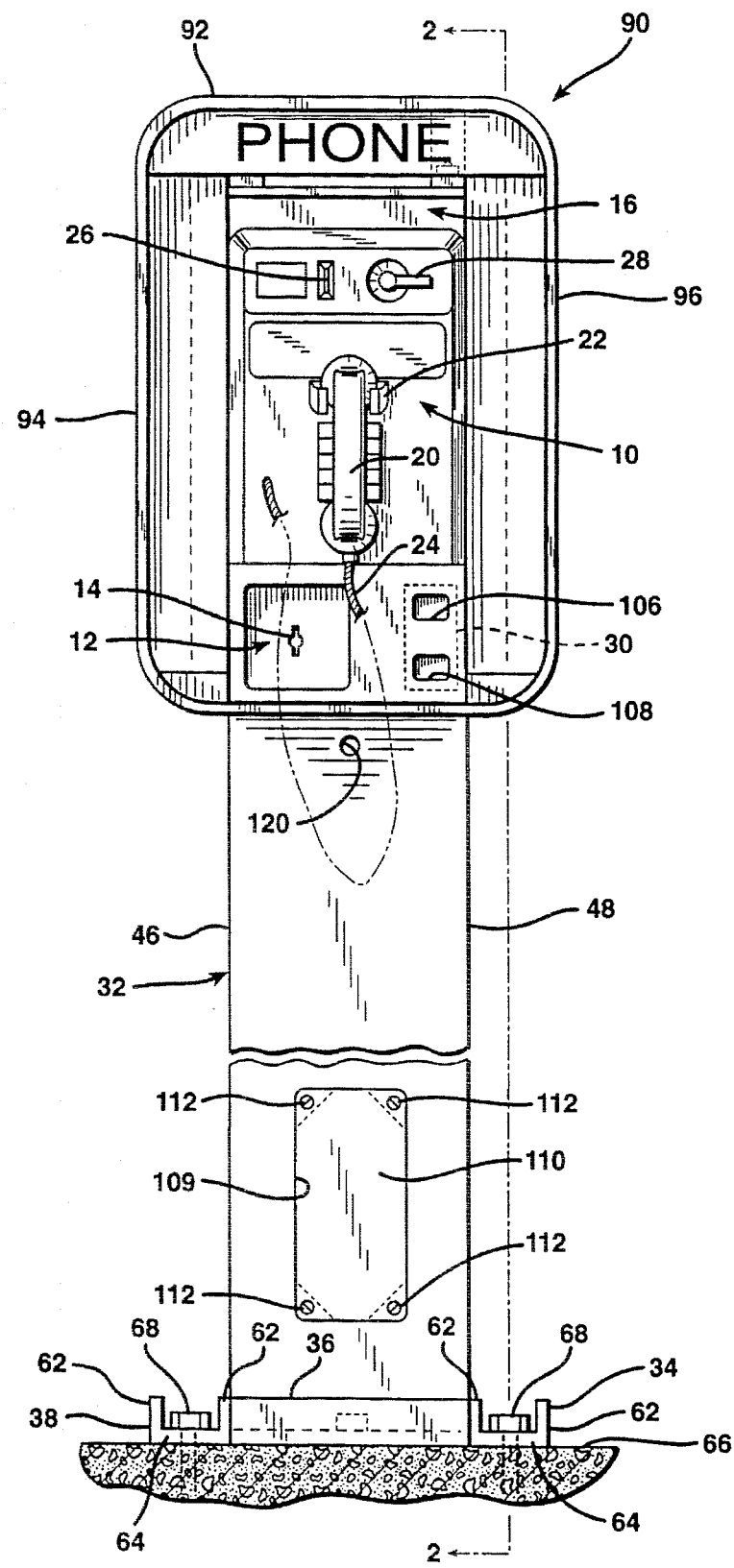
FIG. 1 is a front elevational view of a combination of a coin-operated telephone, a protective stand, and a sheltering hood according to the invention.

FIG. 1 illustrates a coin-operated telephone 10 which is of conventional construction. The coin-operated telephone 10 has an internal coin box 13 that is accessible to authorized personnel by means of a coin box access door 12 that may be opened by a special key that fits within a keyhole 14 of unique configuration. The telephone 10 has a surrounding, heavy-duty, steel casing 16 that is of a generally rectilinear configuration. The casing 16 is typically about eight inches in width, as viewed in FIG. 1, about six inches in depth, as viewed in FIG. 2, and about twenty-four inches in height. The casing 16 surrounds the operating mechanisms for processing coins inserted into the telephone 10, as well as the communication circuitry housed therewithin.

The upper front portion of the telephone casing 16 is removable from the remaining portion thereof only with the aid of a special tool provided only to authorized telephone maintenance personnel. As with conventional coin-operated telephones, the telephone 10 has a handset 20 that normally rests on a receiver cradle 22 when the telephone is in the on-hook condition. The handset 20 is connected to the interior operating circuit residing within the casing 16 by means of a conventional shielded cord 24. The telephone 10 has a coin insertion slot 26 near its top, a coin return lever 28 also in its upper portion, and a coin receiving tray door indicated in phantom at 30 in FIG. 1.

Figure 4:
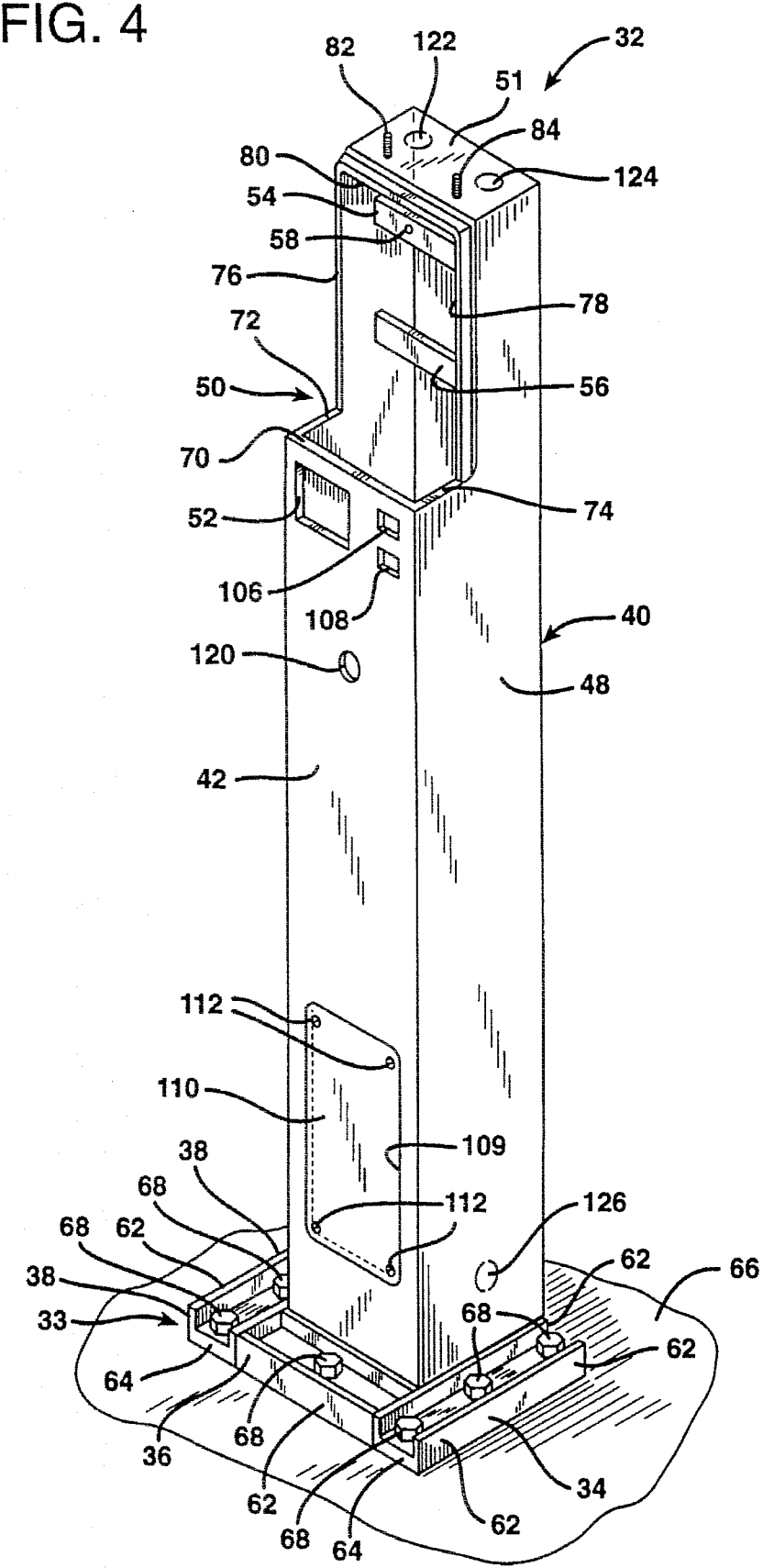
FIG. 4 is a perspective view showing the stand of the invention in isolation.

The novel structure of the combination of the invention is the protective stand 32, illustrated in isolation in FIG. 4. The protective stand 32 is comprised of a base 33, a column 40, a phone mount, and a fastener. The base 33 is formed by three upturned channel sections indicated at 34, 36, and 38. A hollow column 40 rises from the base 33. The column 40 is formed of 3/16 inch thick steel plates disposed in a vertically upright orientation and at right angles to each other to form a structure having a rectangular cross-section as shown in FIG. 3. The steel plates of the column 40 form a laterally enclosing front wall 42, a back wall 44, and opposing left and right side walls 46 and 48, respectively. The walls 42, 44, 46, and 48 all rise from the lower extremities at which they are secured to the base 33 to their upper extremities at the upper end of the column 40. The column 40 defines a seating opening indicated at 50 at its upper end. When mounted on the stand 40 the outer casing 16 of the telephone 10 is disposed in the seating opening 50 in the column 40. The lower portion of the casing 16 is confined within the lateral confines of the front, back, and opposing side walls 42–48 as illustrated in FIG. 2.

The stand 40 is further comprised of a horizontally disposed roof 51 which spans the distance between and is welded to the upper extremities of the side walls 46 and 48. The roof 51 is also welded to and extends forwardly from the upper extremity of the back wall 44.

The column 40 also defines a coin box door access opening 52 within its front wall 42, the top edge of which is located about three inches beneath the upper extremity thereof. The opening 52 is normally about four inches square. The access opening 52 provides authorized access to the contents of the coin box 13 through the coin box door 12 of the telephone 10.

The stand 32 is also provided with a phone mount in the form of a pair of horizontally disposed, mutually parallel, vertically aligned, transversely extending, upper and lower mounting braces 54 and 56 which extend between and are welded to the interior surfaces of the left and right side walls 46 and 48 of the column 40. The uppermost brace 54 has an interiorly threaded, horizontally disposed tapped opening 58 therethrough, located off-center. The mounting braces 54 and 56 are located within the perimeter of the front, back, and side walls 42–48.

The stand 32 further includes a fastener in the form of a single bolt 60, visible in FIGS. 2 and 3. The bolt 60 is inaccessible from the exterior of the telephone case 16 and from the exterior of the column 40. The bolt 60 secures the telephone 10 to the phone mounting brace 54 by virtue of its threaded engagement in the tapped opening 58.

The base 33 is formed by the sections of channels 34, 36, and 38 which are arranged in a concave, upwardly facing disposition and which have vertically oriented sides 62 that project from horizontal webs 64. The channel sections 34, 36, and 38 are welded to each other and to the side walls 46 and 48 and to the front wall 42 where they make contact therewith. Each of the channel sections 34, 36, and 38 is formed of steel. The upright sides 62 of the channels 34, 36, and 38 are one and a half inches high, while the horizontally disposed webs 64 from which the channel sides 62 rise are four inches wide.

The channel sections 34 and 38 are secured to the underlying supporting concrete slab 66 by means of three bolts 68 which are directed downwardly through the channel webs 64 into the underlying concrete surface 66 therebeneath. The central, transverse channel 36 is likewise secured to the underlying concrete slab 66 by a single, centered bold 68. With this manner of attachment the base 33 of the stand 32 is firmly secured to the underlying, supporting concrete slab 66.

The upstanding sides 62 prevent the bolts 68 from being disengaged from the underlying support 66 through use of a monkey wrench or a crescent wrench. This construction thus inhibits a thief from attempting to remove the stand 32 from the underlying support 66. Furthermore, the weight of the stand 32 itself is a significant deterrent to a potential thief seeking to detach the entire combination from the underlying support 66. Indeed, the stand 32 alone weighs approximately ninety pounds.

The column 40 has a square cross-section, as is evident in FIG. 3, and defines a square interior enclosure having internal dimensions of eight inches by eight inches. The front surfaces of the mounting braces 54 and 56 are spaced from the plane of the interior vertical surface of the front wall 42 a distance of six inches. Thus, the eight inch wide by six inch deep outer casing 16 of the telephone 10 is able to fit snugly into the seating opening 50 supported from behind by the transverse braces 54 and 56.

As is most evident in FIGS. 2 and 3, the cross-sectional enclosure of the column 40 has a depth greater than the depth of the exterior casing 16 of the telephone 10. This allows wiring to be vertically run in the space 130 behind the telephone 10. The hollow column 40 thereby protects the wiring as well as the telephone 10.

As illustrated in FIG. 4, the seating opening 50 is defined by an upwardly facing, horizontally disposed top edge 70 of the front wall 42, upwardly facing, horizontally disposed edges 72 and 74 of the left and right side walls 46 and 48, respectively, forwardly facing, vertically disposed edges 76 and 78 of the left and right side walls 46 and 48, respectively, and a forwardly facing, transversely oriented, vertically disposed edge 80 of the roof 51. As shown in FIGS. 2 and 3 the outer casing 16 of the telephone 10 fits snugly into the seating opening 50 and is supported from behind by the transverse braces 54 and 56. The outer surface of the telephone casing 16 resides in close contact with the interior surfaces of the front wall 42 and the side walls 46 and 48, and with the underside, interior surface of the roof 51 adjacent all the edges 70–80 that define the seating opening 50. The fit is snug enough so that a crowbar or other such implement cannot be inserted into the demarcation between the casing 16 and the surrounding structure of the column 40.

As best illustrated in FIGS. 2 and 4, the stand 40 is provided with a pair of upright, vertically oriented, laterally spaced, externally threaded mounting studs 82 and 84. The studs 82 and 84 are spaced laterally inwardly from the exterior surfaces of the side walls 46 and 48 a distance of one inch and extend upwardly three-quarters of an inch above the upwardly facing outer surface of the roof 51. As shown in FIG. 2, the mounting studs 51 have a spacing and configuration that allows them to be used to mount conventional, protective, telephone-booth hoods, such as the hood 90 illustrated in FIGS. 1–3.

The hood 90 is a conventional hood of the type used to provide protection from the elements and for noise reduction with conventional outdoor, coin-operated telephones 10. The hood 90 has an overhead canopy 92 and side partitions 94 and 96. The depending vertical leg 98 of a transversely extending mounting angle bar 100 is welded to the underside of the metal canopy 92. The vertical leg 98 of the mounting angle bar 100 extends downwardly to its transition with the horizontally extending leg 102 of the mounting angle bar 100. The horizontal leg 102 of the mounting angle bar 100 has vertically oriented apertures defined therein with a transverse spacing to receive the studs 82 and 84 that are employed to attach the hood 90 to the stand 40 as illustrated in FIG. 2.

The stand 40 is provided with other features that enhance its utility with conventional telephones 10. Specifically, upper and lower coin return door openings 106 and 108 are defined in the front wall 42 of the column 40. The openings 106 and 108 are spaced laterally from the coin box door opening 52 and in vertical alignment with each other. The locations of the openings 106 and 108 is such that when the telephone 10 resides in the seating opening 50, the coin return door openings 106 and 108 are in registration with the upper and lower ends of the coin return door 30 of the telephone 10. The lower opening 108 is positioned near the bottom of the coin return tray door 30 directly in front thereof and is big enough to allow a user to push the lower portion of the hinged coin return door 30 rearwardly and retrieve coins from the bottom of the coin return tray through the opening 108. The upper opening 106 is large enough to allow the upper portion of the hinged coin return door 30 to rotate forwardly, but is small enough to limit rotation of the hinged coin return closure so that a thief cannot insert any material into the coin return tray to plug up the coin return chute. The vertically spaced openings 106 and 108 thereby allow retrieval of returned coins from the telephone 10 that fall into the bottom of the coin return tray, yet they inhibit theft from the coin return portion of the telephone 10.

The front wall 42 of the column 40 also has a rectangular wire access opening 109, approximately four inches wide and eight inches high defined therewithin. This wire access opening 109 is closed by a removable panel 110. The panel 110 is secured by means of screws 112 to bearing relief ledges that are left intact at the four corners of the wiring access opening 109. Thus, the hollow column 40 is provided with an access opening through which servicing personnel can gain access to telephone lines that enter through the opening in the bottom of the stand 40. Nevertheless, the access opening 109 is elevated above the level of the underlying supporting surface 66 a sufficient distance so that a thief cannot insert the lift pad of an automotive vehicle jack into the opening 109 and lift the stand 40 from the underlying support 66.

As shown in FIG. 4, the column 40 is provided with a circular, optical sensor port 120 five-eighths of an inch in diameter. When the telephone 10 is inserted into the seating opening 50 as illustrated in FIG. 2, the optical sensor port 120 resides is registration with optical sensors that are conventionally employed in telephones 10 of the type described. Such optical sensors are sometimes employed so as to turn on lights beneath the canopy 92 in the hood 90 as a user approaches the telephone 10 and stands in front of the sensor port 120.

The column 40 further defines removable wiring access port closures 122 and 124 in the roof 51 and a wiring access port closure 126 in the right side 48 of the column 40. These access port closures are die stamped as removable slugs into the steel plates from which the side wall 48 and roof 51 are formed prior to assembly of the column 40. The die stamping leaves the removable wiring access port closures 122, 124, and 126 secured in position by narrow, frangible webs. Any one or all of the access port closures 122, 124, and 126 can be removed by the use of a hammer and a punch if it is necessary to run wiring vertically downwardly from a telephone pole through the roof 51 or laterally into the column 40 from the side.

To install the telephone 10 in the stand 40, a special tool of the type authorized only for use by telephone company personnel is employed to remove a single bolt from on of the side panels of the upper front portion 17 of the casing 16. This allows removal of the upper front portion 17 from the remainder of the casing 16 and provides access to the back panel 132 of the telephone casing 16, visible in FIGS. 2 and 3. At this point, with the upper front portion 17 of the exterior telephone box casing 16 removed, the installer lifts the remaining portion of the telephone casing 16 and tilts the top of the back panel 132 thereof forwardly at about a fifteen degree angle relative to vertical as the coin box 13 and remaining lower portion of the telephone casing 16 are inserted into the opening 50. Once the casing 16 has been inserted into the opening 50 far enough so that the top of the casing 16 will clear the underside of the roof 51, the upper end of the telephone 10 is rotated rearwardly, in a clockwise direction as viewed in FIG. 2, thereby bringing the back panel 132 of the telephone casing 16 into vertical alignment and into contact with the transverse mounting braces 54 and 56.

The telephone 10 is then lifted up until the top of the casing 16 resides in abutment against the underside of the roof 51. The pair of transverse back mounting braces 54 and 56 support the case 16 of the telephone 10 from the rear. In this position a hole in the back 132 of the telephone casing 16 will reside in coaxial alignment with the tapped opening 58 in the mounting brace 54. The fastening bolt 60 can then be engaged in the tapped opening 58 through the aligned opening in the back 132 of the telephone casing 16.

The fastening bolt 60 extends through the rear wall 132 of the telephone casing 16 and is engaged in the opening 58 in the transverse brace 54. The single bolt 60 is sufficient to securely mount the telephone 10 in the seating opening 50. When the telephone 10 is installed in this manner, its outer casing 16 fits snugly into the seating opening 50 supported from behind by the transverse braces 54 and 56. Also, the outer surfaces of the lower, rear, side, and top portions of the telephone casing 16 reside in contact with the interior surfaces of the front wall 42, the side walls 46 and 48, and the underside of the roof 51 adjacent all the edges 70–80 that define the seating opening 50.

Once the telephone 10 has been mounted within the confines of the column 40 the upper front portion 17 of the casing 16 is reinstalled using the specialized tool designed for this purpose. The fastening bolt 60 thereupon becomes inaccessible from the exterior of the telephone casing 16 and from the exterior of the stand 32.

Undoubtedly, numerous variations and modifications of the coin-operated machine stand will become readily apparent to those familiar with such devices. For example, the stand 32 could be configured to the dimensions of a vending machine of a slot machine if desired. Also, a pad type mounting base could be employed instead of the channels 34, 36, and 38 forming the base 33 of the stand 32. Accordingly, the scope of the invention should not be construed as limited to this specific embodiment depicted and described.

I claim:

1. A stand for a coin-operated machine having an exterior, an interior protected by said exterior, a coin collection box within said interior, and a coin box access door in said exterior, comprising:

a base firmly attached to an underlying support;

a hollow, upright column permanently secured to said base and having vertical enclosing walls and defining an upper end with a seating opening therein for seating said coin-operated machine therewithin such that said coin-operated machine is laterally confined within said enclosing walls;

a mount located internally within said enclosing walls proximate said seating opening;

a fastener inaccessible from the exterior of said coin operated machine for securing said coin-operated machine to said mount, and wherein said upright column defines a coin box door access opening in said enclosing walls below said upper end for providing authorized access to said coin box door of said coin-operated machine.

2. A stand according to claim 1 further comprising a roof located at the upper extremities of said side walls and said back wall wherein said roof of said stand extends at least partially over said coin-operated machine when said coin-operated machine is seated in said seating opening.

3. A stand according to claim 1 wherein said column is of uniform, outer cross-section beneath said seating opening therein.

4. A stand for a coin-operated telephone having a case with a coin box located therein and an access door in said case providing authorized access to said coin box, comprising:

a base firmly secured to an underlying support, a hollow column of rectangular cross-section permanently secured to said base and extending vertically upwardly therefrom and having laterally enclosing front, back, and opposing side walls all having upper ends terminating at upper extremities and defining a seating opening at said upper extremity of said front wall and at the forward portions of said opposing side walls at the upper ends thereof for receiving said case of said coin operated telephone within the lateral confines of said front, back, and side walls, a coin box door access opening defined in said front wall beneath said seating opening for providing authorized access to said coin box of said coin-operated machine, a telephone mount located internally within said column behind said seating opening therein, and a fastener located internally within said coin-operated telephone for securement to said telephone mount.

5. A stand according to claim 4 further comprising a roof extending across said upper extremities of said side walls and forwardly from said upper extremity of said back wall, whereby said roof extends partially over said case of said telephone.

6. A stand according to claim 4 further comprising a wiring access opening in said column located at an elevated level above said base.

7. A stand according to claim 5 wherein said column further defines removable wiring access port closures therein.

8. A stand according to claim 4 wherein said telephone mount is comprised of a pair of transverse backing braces supporting said case of said telephone from the rear thereof, and said fastener is comprised of a bolt that extends through the rear of said telephone case and is engaged in one of said transverse braces.

9. A stand according to claim 4 further comprising upper and a lower coin return tray openings in said front wall of said column spaced laterally from said coin box door opening, to allow retrieval of returned coins from said telephone.

10. A stand according to claim 4 wherein said front and side walls are formed with lower extremities and said base is comprised of channel members permanently secured to the outer surfaces of at least said front and side walls at said lower extremities thereof wherein said channel members are disposed to face concave upwardly and are formed with spaced mounting fastener openings defined therein.

11. A stand according to claim 4 further comprising an optical sensor port formed in said front wall of said column.

12. In combination, a coin-operated telephone having an internal coin box and a surrounding outer casing with a coin box door therein; a protective stand including a base firmly secured to an underlying support, a hollow column of rectangular cross-section permanently secured to said base and extending vertically upwardly therefrom and having laterally enclosing front, back, and opposing side walls formed with upper extremities and defining an upper end with a seating opening therein in which said outer casing of telephone is disposed within the lateral confines of said front, back, and opposing side walls, and defining a coin box door access opening within its front wall for providing authorized access to said coin box door of said telephone, a phone mount located internally within said column within the lateral confines of said front, back, and side walls; and a fastener inaccessible from the exterior of said telephone case and from the exterior of said column and securing said telephone to said phone mount.

13. A combination according to claim 12 wherein said protective stand is further comprised of a roof spanning said upper extremities of said side walls and extending forwardly from said upper extremity of said back wall and wherein said seating opening is defined by an upwardly facing top edge of said front wall, at said upper extremity thereof, upwardly and forwardly facing edges of said side walls and a forwardly facing edge of said roof.

14. A combination according to claim 13 wherein said phone mount includes at least one transverse brace within said column extending between said side walls thereof and wherein said outer casing of telephone fits snugly into said seating opening supported from behind by said transverse brace and residing in contact with said front and side walls and said roof adjacent all said edges that define said seating opening.

15. A combination according to claim 14 wherein said protective stand is equipped with mounting studs and further comprising a sheltering hood secured on said mounting studs to said stand.

16. A stand according to claim 4 further comprising a wiring access opening in said column located at an elevated level above said base.

* * * * *